June 11, 1963 R. B. METZNER 3,093,022
SHEAR MEANS HAVING INTERMITTENTLY OPERATED CAM MEANS
TO HOLD SHEAR IN OPEN POSITION
Filed Jan. 20, 1958 7 Sheets-Sheet 1

INVENTOR
Robert B. Metzner

Fig. 2.

INVENTOR
Robert B. Metzner

Fig. 4.

June 11, 1963 R. B. METZNER 3,093,022
SHEAR MEANS HAVING INTERMITTENTLY OPERATED CAM MEANS
TO HOLD SHEAR IN OPEN POSITION
Filed Jan. 20, 1958 7 Sheets-Sheet 5

INVENTOR
Robert B. Metzner
his Attorneys

June 11, 1963 R. B. METZNER 3,093,022
SHEAR MEANS HAVING INTERMITTENTLY OPERATED CAM MEANS
TO HOLD SHEAR IN OPEN POSITION
Filed Jan. 20, 1958 7 Sheets-Sheet 6

Fig. 6.

INVENTOR
Robert B. Metzner
By Thorpe, Leonard & Buell
his attorneys

INVENTOR
Robert B. Metzner 3,093,022
SHEAR MEANS HAVING INTERMITTENTLY
OPERATED CAM MEANS TO HOLD SHEAR
IN OPEN POSITION
Robert B. Metzner, Wheeling, W. Va., assignor to Wheeling Steel Corporation, Wheeling, W. Va., a corporation of Delaware
Filed Jan. 20, 1958, Ser. No. 709,848
8 Claims. (Cl. 83—320)

This invention relates to shearing material into lengths and is particularly concerned with cutting of sheets of material from long strips thereof.

Heretofore, in the manufacture of many products, it has been customary to manufacture the material in strips and to shear convenient lengths therefrom. This is frequently done employing the well-known principle of the flying shear. Where the material is manufactured for commercial use, a wide range of sizes is frequently ordered with the result that the shear must be adjusted to cut varying lengths. In the manufacture of many products, when an order is filled, and a new order of different size pieces is about to be processed, it is common to shut down the manufacturing line until adjustments are made to fill the new order. In some instances, it is difficult or impossible to shut down a manufacturing line. In the manufacture of glass wool for example, the glass is drawn continuously from the furnace, and the wool is produced therefrom. For proper operation, the wool must be drawn and moved away from the furnace without interruptions, and the line cannot be shut down when changes in size are made.

I provide a shear placed at the end of a material-producing line and having a knife constantly urged towards cutting position, means urging the knife towards cutting position, and means intermittently opposing and permitting movement of the knife to cutting position and then returning it to open position. I preferably provide movable knife operating means, means resiliently urging the knife operating means in one direction to bring the knife to cutting position, cam follower means connected to the operating means, and cam means which cooperate with the cam follower means to control opening and closing of the knife. I further preferably provide screen cam means and screen cam follower means connected to the knife operating means in operative relation therewith. I preferably drive the screen cam means in predetermined relationship to the main cam means whereby the knife is under control of the main cam and screen cam means. I further preferably provide means shifting the screen cam means and screen cam follower means from operative to inoperative relationship. I further preferably provide a plurality of screen cams which may be suitably employed in operative or inoperative position. I further preferably provide means for reciprocating the shear knife parallel to the plane of passage of material, and means synchronizing the cam means with said movement.

Other details, objects and advantages of the invention will become more apparent as the following description of a present preferred embodiment thereof proceeds.

In the accompanying drawings, I have illustrated a present preferred embodiment of my invention in which.

The flying shear is grouped broadly into a drive motor 1, a planetary gearbox 2 enclosing a planetary gear train, a speed change mechanism enclosed within a housing 3 and the shear proper 4.

The shear is employed to cut glass wool into lengths for various uses. The wool is formed continuously and carried on a moving conveyor where it cools, eventually being deposited on belts 6. Belts 6 operate continuously at the line speed and convey glass wool toward the shear knife. A further conveyor (not shown in the drawings) is provided to carry sheared pieces away from the shear for further handling and packing. The manufacturing facilities operate to produce the wool continuously. There is a substantially constant flow of wool to the shear, although the speed of the line varies from time to time as operating conditions change. Belts 6 are driven at a speed synchronized with the speed of the conveyor.

*The Shear*

The shear is mounted in a housing 5 at the end of the line producing glass wool. The shear is driven through a coupling 7 which rotates a drive shaft 8 mounted in bearings 9, 10 and 11. Three spur gears 12, 13 and 14 and a bevel gear 15 are keyed in fixed position on drive shaft 8.

A reciprocating carriage 16 carrying the shear knives is mounted on the upper face of shear housing 5. The carriage is slidable along the direction of movement of the glass wool within its limits of movement. The carriage and knives are arranged in the customary manner in which the carriage approximates the speed of the moving material during the cutting stroke, and then returns counter to the flow of material with the knives open to begin another stroke. Carriage 16 is held in place by pairs of interlocking slides 17 and 18 fixed to the carriage and to the housing. A member 19 (FIGURE 2) extends between the two end walls of housing 5, parallel to the direction of movement of the wool. A member 20 is mounted on the underside of the reciprocating carriage 16 above member 19. The opposed faces of members 19 and 20 are provided with gear teeth and a pinion 21 engages both sets of teeth. A pinion 21 is rotatably mounted in plates 22 which are held in position between plates 23 extending between ends of housing 5. Ball bearings 24 are positioned in openings in plates 22 and prevent binding as the carriage reciprocates. The complete assembly prevents the carriage from twisting during reciprocation and insures movement in one plane only.

A bed knife comprising sections 25 and 26 is mounted upon carriage 16. The two knife sections are placed parallel and slightly separated to receive moving knife 27. The glass wool passes between knife 27 and bed knife sections 25 and 26 and is sheared by drawing knife 27 downwardly into the gap between knife sections 25 and 26. Knife 27 is mounted on two operating rods 28 which are slidably mounted in tubes 29 which are attached to carriage 16.

Figure 5:
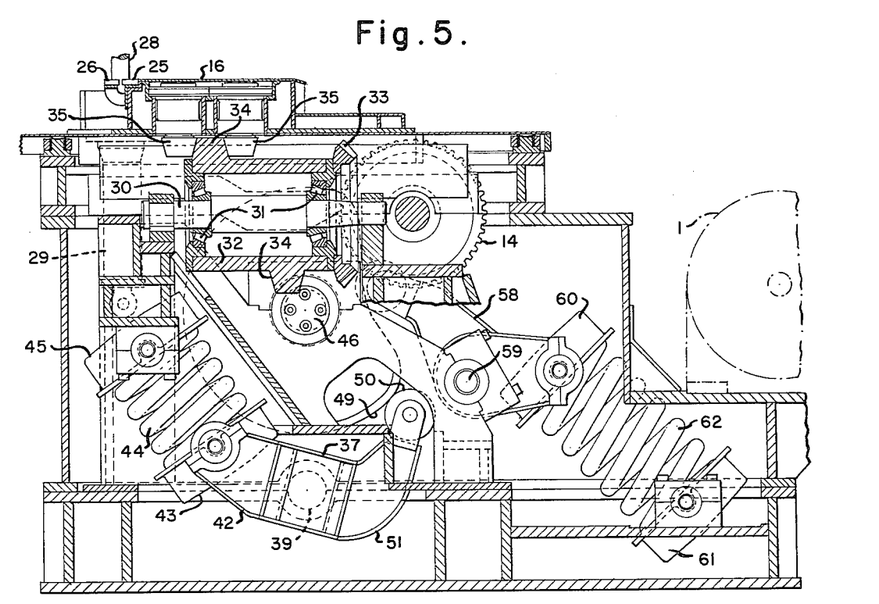
FIGURE 5 is a sectional view taken along line V—V of FIGURE 2.

A cam shaft 30 (FIGURE 5) is fitted in housing 5 immediately beneath carriage 16. A barrel cam 32 is rotatably mounted on shaft 30 on bearings 31. A bevel gear 33 fixed on one end of barrel cam 32 engages bevel gear 15 on drive shaft 8. A ridge 34 extends between opposite ends of the barrel cam and is engaged by two roller followers 35 which are mounted on the lower side of carriage 16.

A protective safety screen 36 is placed above carriage 16 and knife 27. A number of radiant heaters may be positioned within screen 36 to heat knife 27. Some types of glass wool are formed on an asphalt paper base, and heat on the knife is required to prevent it from clogging with asphalt.

A fabricated rocker shaft 37 is journaled in the lower part of housing 35 in bearings 38, the axis of rotation being indicated at 39. Arms 40 projecting from each end of shaft 37 are pivotally connected to links 41 whose other ends are pivotally connected to operating rods 28. An arm 42 (FIGURE 5) extending from shaft 37 pivotally supports a cap 43 which receives a spring 44. The other end of spring 44 is fitted in a cap 45 which is pivotally mounted in housing 16. The spring is mounted under compression and urges rocker shaft 37 in a direction to draw knife 27 downwardly to the cutting position (counterclockwise as viewed in FIGURE 5).

Figure 6:
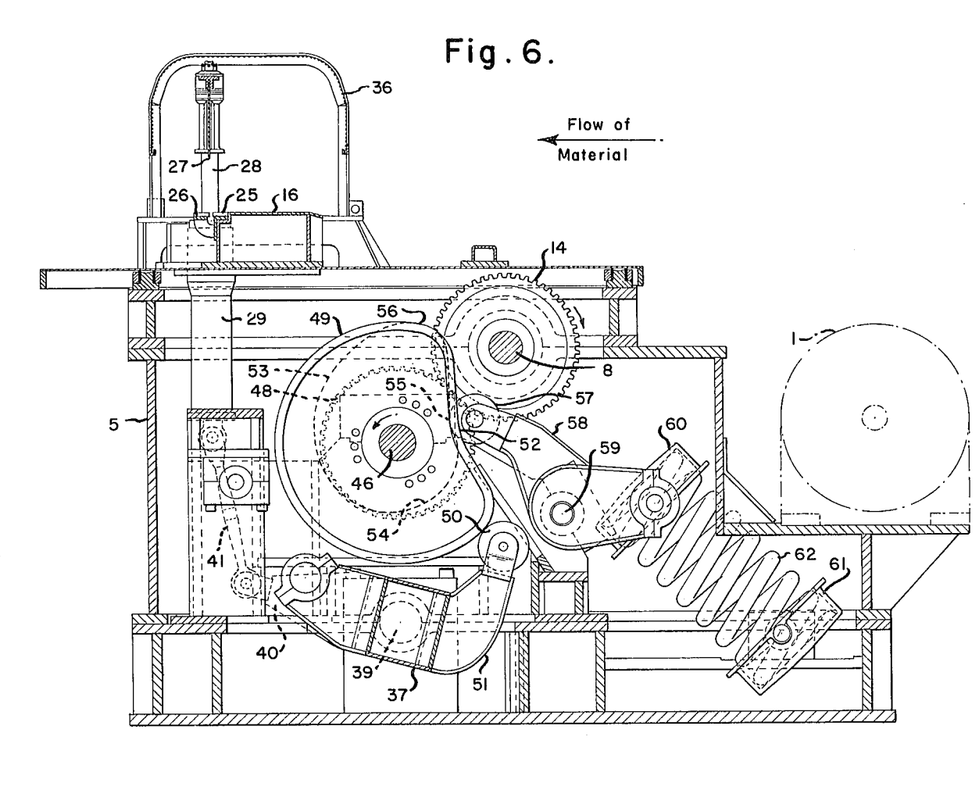
FIGURE 6 is a sectional view taken along line VI—VI of FIGURE 2.

A countershaft 46 (FIGURES 2 and 6) is journaled within the shear housing in bearings 47. A spur gear 48 is fixed on countershaft 46 and engages gear 14. A main cam 49 is fixed on main shaft 46. Main cam follower 50 is mounted on an arm 51 extending from rocker shaft 37 and maintains contact with the circumferential face of main cam 49. It will be noted that main cam 49 is circular around the major part of its circumference but that it has a low point indicated at 52. Spring 44 maintains follower 50 against the circumference of main cam 49. When follower 50 is in contact with the circular portion of main cam 49, knife 27 will be in its topmost position as illustrated in the drawings. As main cam 49 revolves and follower 50 comes into contact with low point 52 of main cam 49, knife 27 will be drawn downwardly by the action of spring 44 until it is in the slot between bed knife sections 25 and 26. When cam 49 is in the position shown in FIGURE 6, knife 27 has just been returned to its uppermost position and will remain so as main cam 49 rotates with the circular portion of the cam in contact with follower 50. A counterbalance cam 53 is likewise fixed in position on countershaft 46. Counterbalance cam 53 has a spiral portion 54 extending from a low point 55 around the major part of its circumference to a high point 56 from which the cam surface rapidly falls to low point 55. A roller follower 57 for the counterbalance cam is mounted on a fabricated crank 58 which is in turn pivotally mounted on the shear housing on pivot 59. A cap 60 is pivotally mounted on the other arm of crank 58. A second cap 61 is pivotally mounted on housing 16, and a compression spring 62 extends between caps 60 and 61. Main cam 49 and counterbalance cam 53 are positioned on countershaft 46 as indicated in FIGURE 6. When roller follower 50 is descending from the circular portion of main cam 49 to low point 52, a large force exerted by spring 44 tends to drive the shear ahead of the motor speed, and substantially all of the energy required is provided by spring 44. Conversely, during the time when follower 50 moves from low point 52 back to the circular portion of the main cam, as shown in FIGURE 6, sufficient power must be supplied not only to drive the shear but also to compress spring 44. During the time that follower 50 is moving from the low point of main cam 49 up to the circular position, follower 57 is dropping from the high point 56 of counterbalance cam 53 to low point 55. Consequently, compression spring 62 is extending at the same time spring 44 is being compressed and the spring forces will largely offset one another during this time. Spring 62 will be gradually compressed during rotation of counterbalance cam 53 as follower 57 rides around spiral 54 to point 56 on cam 53. Countershaft 46 is geared to make one revolution during the time that barrel cam 32 makes one revolution. When main cam 49 and counterbalance cam 53 are positioned as indicated in FIGURE 6, carriage 16 has just concluded its travel in the direction of movement of the glass wool and is about to return for another stroke. Knife 27 has just completed its cutting cycle and has returned to its upper most position.

Figure 2:
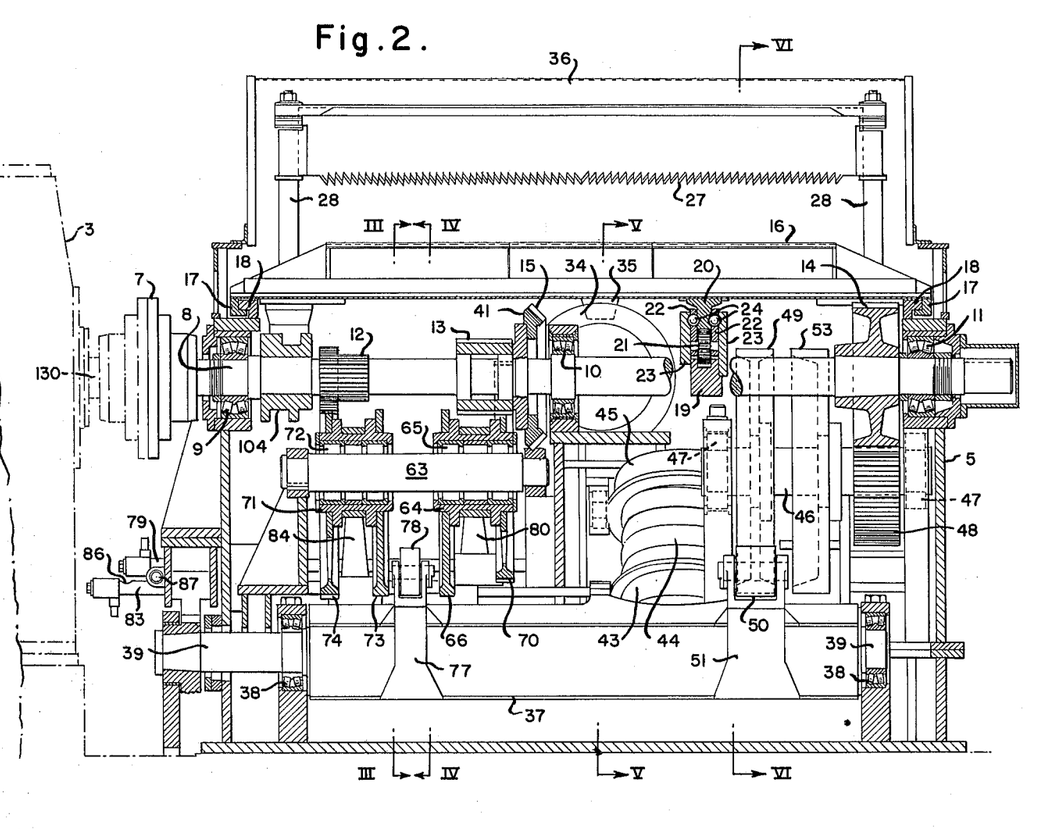
FIGURE 2 is a sectional view taken along line II—II of FIGURE 1.
Figure 3:
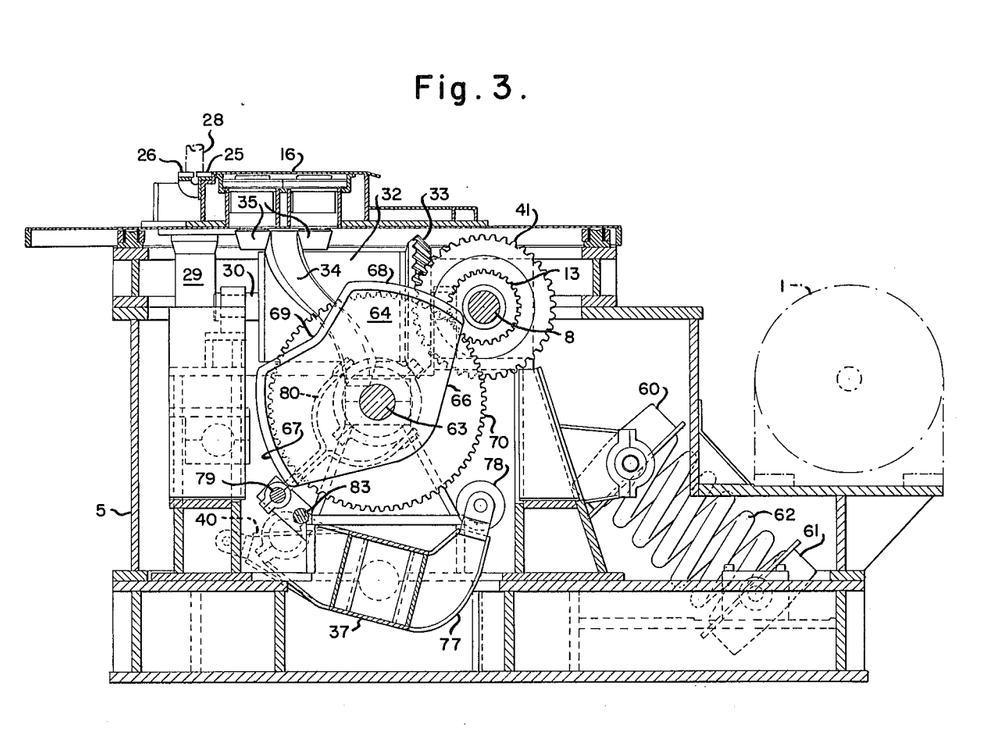
FIGURE 3 is a sectional view taken along line III—III of FIGURE 2.
Figure 4:
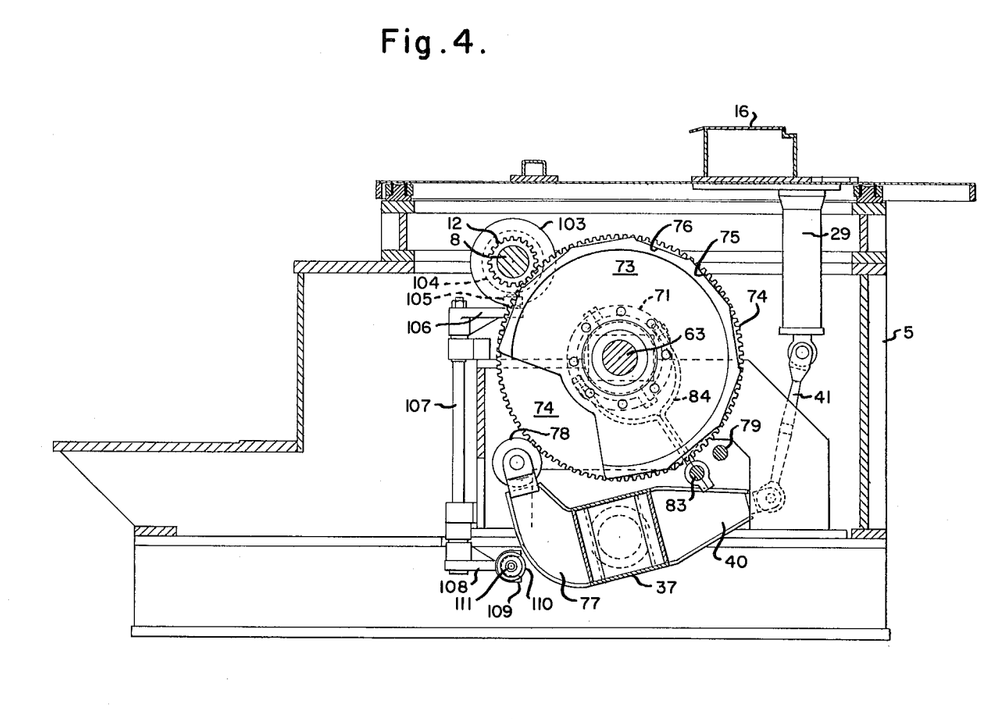
FIGURE 4 is a sectional view taken along the line IV—IV of FIGURE 2.

A countershaft 63 is mounted within shear housing 16 (see FIGURE 2). A screen cam assembly 64 is mounted on countershaft 63 on roller bearings 65. The fit of the bearings permits sliding movement of the screen cam assembly along countershaft 63 as well as rotational movement. The screen cam assembly comprises a screen cam 66 on which a cam surface is formed having high points 67 and 68 (FIGURE 3) and a low point 69. A spur gear 70 is a part of the screen cam assembly and engages spur gear 13 mounted on drive shaft 8. The gear ratio between gear 70 and gear 13 is 3:1, with the result that screen cam assembly 64 makes one revolution for every three revolutions of barrel cam 32 and main cam 49. A second screen cam assembly 71 is slidably and rotatably mounted on countershaft 63 on roller bearings 72. Screen cam assembly 71 comprises a screen cam 73 (FIGURE 4) and a spur gear 74 which meshes with spur gear 12 on drive shaft 8. Screen cam 74 has a cam surface comprising a plurality of surfaces 75 and 76. It will be noted that surfaces 76 are slightly closer to the center of screen cam 73. The gear ratio between spur gears 12 and 74 is 6:1, whereby screen cam assembly 73 makes one revolution for every six revolutions of barrel cam 32 and main cam 49, and it makes one revolution for every two revolutions of screen cam assembly 64.

An arm 77 projecting from rocker shaft 37 carries a roller follower 78. Follower 78 will engage the working surfaces of screen cam 66 or 73 when either screen cam assembly is shifted from the position shown in FIGURE 2 toward the other screen cam assembly to a center position on countershaft 63.

Figure 7:
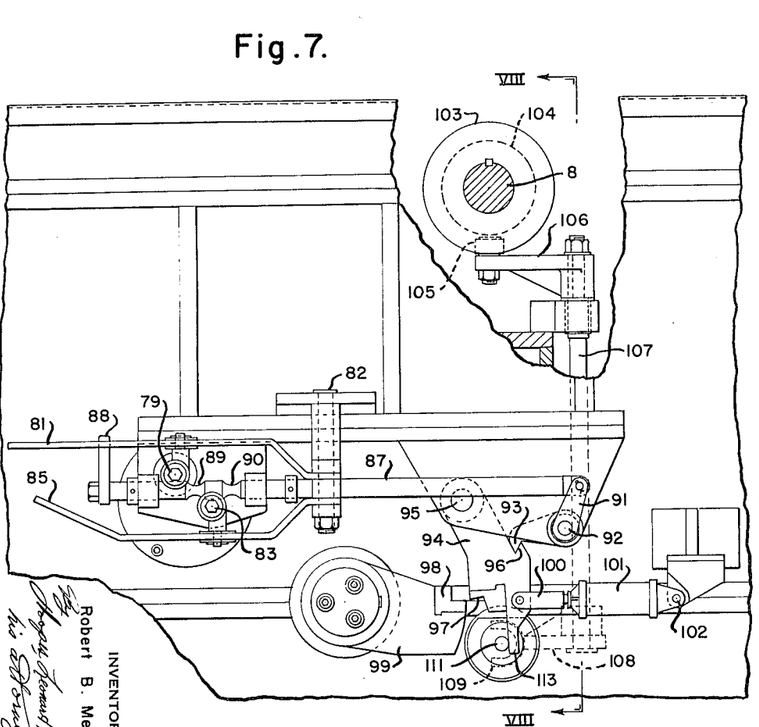
FIGURE 7 is a partial side elevation of the shear housing showing particularly the screen cam shifting means.

A shift rod 79 (FIGURES 2, 7 and 8) is slidably mounted in shear housing 5, and a shifting lever 80 projecting therefrom connects with screen cam assembly 64. An operating lever 81 is connected to the end of shift rod 79 and is pivoted on pivot pin 82. A second shift rod 83 has a shifting lever 84 connected thereto engaging screen cam assembly 71. Operating lever 85 is connected to the end of shift rod 83 and is pivoted on pivot pin 82. Notches 86 (FIGURES 2 and 8) are formed in shift rods 79 and 83. A locking rod 87 is slidably mounted on the outside of shear housing 5. It is provided with a handle 88. When locking rod 87 is in its locking position as shown in FIGURE 7, it will engage additional notches indicated at 89 (FIGURE 8) in shift rods 79 and 83. The coaction between notches 89 and locking rod 87 prevents either of shift rods 79 or 83 from being moved. When locking rod 87 is moved to its unlocked position, depressions 89 and 90 will become aligned with shift rods 79 and 83, respectively. Either shift rod may then be moved until its notch 86 is aligned with locking rod 87. This will bring the associated screen cam to alignment with screen cam follower 78. Locking rod 87 may then be returned to locked position.

One end of locking rod 87 is pivoted to a crank 91, pivoted about 92. The other end terminates in a detent 93. A lever 94, pivoted at 95, has a ledge 96 whcih engages with detent 93. On the lower portion of crank 94, a hardened seat 97 is positioned. A matching seat 98 is formed on the end of an arm 99 extending from the end of rocker shaft 37. A clevis 100 connects lever 94 to a double-acting piston in cylinder 101 whose end is attached to the shear housing at 102.

Figure 8:
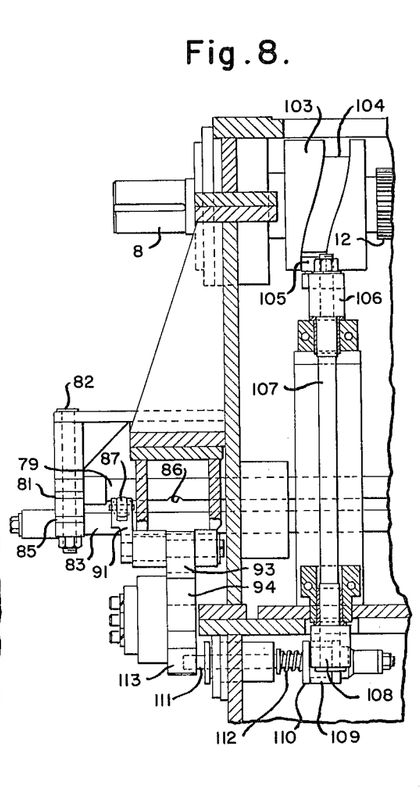
FIGURE 8 is a sectional view taken along line VIII—VIII of FIGURE 7.

A barrel cam 103 having a cam track 104 is mounted on drive shaft 8. A follower 105 on lever 106 is mounted in the cam track. Lever 106 is fixed to rod 107 which is journaled for rotation within the shear housing. A lever 108 at the lower end of rod 107 terminates in a fork 109 engaging the slot in slotted collar 110. Collar 110 is mounted on pin 111 which is in turn mounted in housing 16. A spring 112 urges pin 111 toward the outside of the housing, projecting as shown in FIGURE 8. An extension 113 of lever 94 will be stopped by pin 111 when the pin is in its extended position. Barrel cam 103 will cause pin 111 to be withdrawn into the housing clear of extension 113 once during each revolution. Barrel cam 103 is positioned on drive shaft 8 so that this will occur when knife 27 is at the top of its stroke. Lever 94 may then be shifted and, at that moment, arm 99 will be in such a position that seats 97 and 98 will interlock. Movement of lever 94 will move ledge 96 clear of detent 93.

*Speed Change Mechanism*

Figure 1:
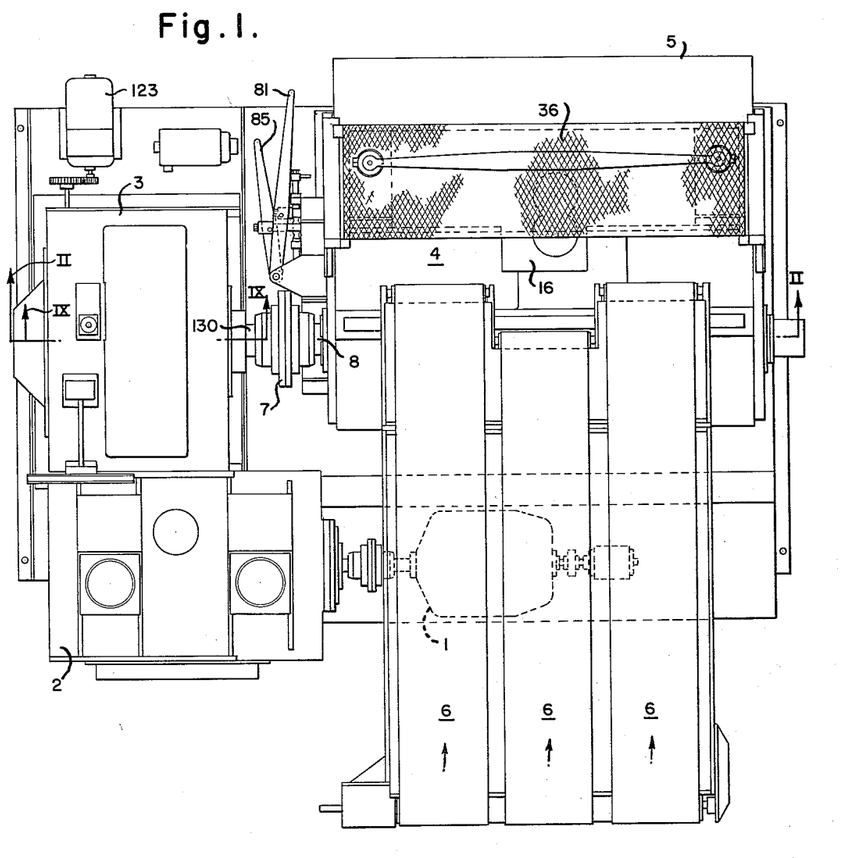
FIGURE 1 is a plan view of a flying shear embodying my invention.

The speed change mechanism permits the relative speeds between the forward and backward reciprocations of the knife carriage to be varied. The speed change mechanism is contained within a housing 3. The mechanism itself is of a well-known type, but it is believed that a brief description will make its use in the present environment clear. The mechanism is shown in elevation in FIGURE 9. A drive gear 114 is driven from a planetary transmission within gearbox 2 (FIGURE 1), gear 114 meshing with a gear connected to the planetary transmission. Gear 114 is fixed on a cylindrical carrier 114a mounted on roller bearings 115 which are supported by a collar 116 fastened to housing 3. A stud 117 is mounted on carrier 114a near the periphery of gear 114 and has a roller 118 mounted on roller bearings on the outer end of stud 117. A support member 119 is positioned within housing 3 and is vertically movable. It is threaded on shaft 120 and is vertically positioned by rotation of the threaded shaft 120 which is rotated through a worm wheel 121 and worm gear 122 driven from an external motor 123. A link 124 is mounted on a shaft 125 journaled in support member 119. Link 124 is provided with two radially extending slots 126 and 127 spaced 180° apart. Roller 118 is fitted within and confined by the edges of slot 126. A similar roller 128 on a crank 129 is fitted within and confined by slot 127. Crank 129 projects from shaft 130 which is journaled through the center of collar 116 and connects to one-half of coupling 7.

*The Planetary Gearing*

A planetary gear train is placed within gearbox 2. It provides a two-speed transmission between motor 1 and drive gear 114 in the speed change mechanism. The purpose is to permit the main drive motor 1 to operate at reasonably high speeds when the shear is being driven at a low speed. The planetary transmission is shiftable under load between high and low ranges and may be shifted while the motor is under load.

*The Electrical Control System*

Figure 10:
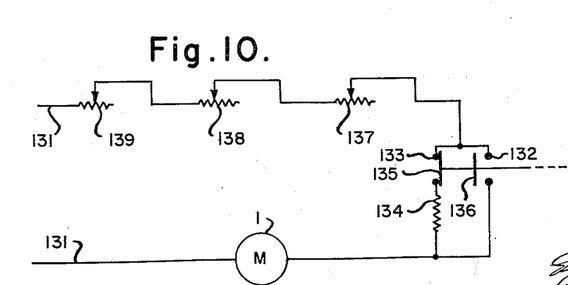
FIGURE 10 is a schematic wiring diagram of the main drive motor.

The electrical control system for main drive motor 1 is schematically shown in FIGURE 10. Motor 1 is connected across wires 131 which supply power to it. One wire has placed in series with it a motor speed control comprising two branches 132 and 133. Branch 133 is provided with a resistor 134. Switches 135 and 136 are mounted for alternative connection of wire 131 through branch 132 or branch 133. Switches 135 and 136 are operated from the means controlling the shifting of the planetary transmission. When the planetary transmission is in a high speed range, switch 135 will be closed and switch 136 will be open, thus introducing resistance 134 into the motor circuit. When the transmission is shifted to the low speed range with a high gear reduction, switch 135 will be opened and, switch 136 will be closed, thereby speeding up the motor and compensating for the change in the transmission gearing.

An adjustable resistor 137 is also provided in the motor circuit. This resistor is ganged with the line speed control and maintains the shear operating at the same speed as the glass wool line which supplies glass wool to the shear along conveyor belts 6. A further adjustable resistor 138 is placed in the motor circuit. Resistor 138 is adjusted automatically by drive motor 123 when the speed change mechanism is adjusted. Resistor 138 is calibrated to operate drive motor 1 to maintain a constant speed on the cutting stroke of the shear regardless of the position of link 124. A trimmer resistor 139 is similarly placed in the motor circuit to permit small trimming adjustments to be manually made from the control panel.

It is to be understood that the above described electrical system is schematic and that additional controls well-known in the motor control art are incorporated in the system to assure accurate and precise motor speed regulation.

*Operation*

In operation, glass wool is produced in a furnace or the like and is supplied continuously to the shear along conveyor belts 6. The glass wool may be of varying thicknesses and may come at varying speeds. It is a characteristic of the machines manufacturing glass wool that they cannot be readily adjusted for speed and cannot be turned on and off at will. Consequently, there is a more or less continuous feed of glass wool at all times the line is in operation.

In starting up, the shear drive motor is adjusted to operate at a speed such that the shear will pace the glass wool on its forward or cutting stroke, thereby following the well-known principle of a flying shear. Motor 1 drives main drive shaft 8 through the planetary transmission and the speed change mechanism. For every revolution of main drive shaft 8, barrel cam 32 will revolve once, causing carriage 16 and knife 27 to make one complete reciprocation concurrently. Main cam 49 will, in the same period of time, make one complete revolution. While carriage 16 is on its forward stroke, the cutaway portion of main cam 49 will come beneath roller follower 50, and the low point 52 on main cam 49 will be beneath roller follower 50 at a point midway on the forward stroke of carriage 16. Main cam 49, after further rotation, will present the generally circular portion to roller follower 50, reaching the position shown in FIGURE 6 as carriage 16 nears the end of its stroke. Spring 44 will continuously urge roller follower 50 against the face of cam 49 and will draw knife 27 downwardly as cam 49 permits it to do so.

Spring 44 exerts a high force, and a strong force is required to compress it. It will be observed in FIGURES 5 and 6 that spring 44 must be compressed following its expansion and the downward stroke of knife 27. The knife must be quickly lifted, and compression must take place during a small part of the total revolution of main cam 49. Counter-balance cam 53 is keyed on countershaft 46 in a definite relationship to main cam 49. Its placing is such that during the time roller follower 50 moves from the low point 52 on cam 49 to the position shown in FIGURE 6 (i.e., spring 44 is being compressed) counterbalance cam follower 57 will move from the high point 56 of cam 53 to the low point 55. Thus, spring 62 will expand at the time spring 44 is being compressed. The spring forces offset one another and little energy is required by the motor to drive the shear during the upward stroke of knife 27. Spring 62 is gradually recompressed as follower 57 rolls on the spiral surface 54 of counterbalance cam 53. Consequently, counterbalance spring 62 is compressed over a major portion of one revolution of countershaft 46 and main shaft 8, whereas it expands and spring 44 is compressed during a small part of one revolution of countershaft 46. The result is that an appreciably smaller drive motor is needed since it need only supply sufficient power to drive the shear and to compress spring 62 over the major part of operation of the shear rather than to supply enough force to compress spring 44 during a very small part of its total operation.

Figure 9:
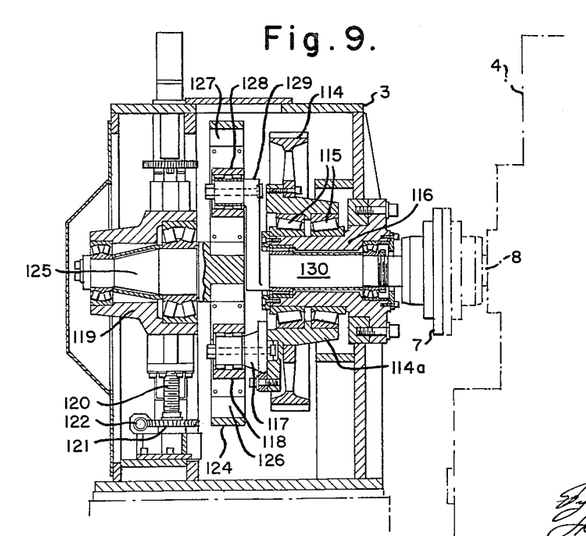
FIGURE 9 is a sectional view taken through the speed change means along line IX—IX of FIGURE 1.

The speed change mechanism (FIGURE 9) permits the length of cut of the shear to be varied. Gear 114 drives carrier 114a, in turn causing rotation of stud 117 and link 124. Link 124 concurrently rotates shaft 130 through crank 129. As illustrated in FIGURE 9, rollers 118 and 128 are equidistant from the center of rotation of link 124. Consequently, shaft 130 will rotate at the same speed as gear 114. If threaded shaft 120 is rotated to move support member 119 upwardly (as seen in FIGURE 9), the distance from roller 118 to the center of rotation of link 124 will be increased, and the distance between roller 128 and the center of rotation of link 124 will be shortened. When link 124 has been so adjusted, but the remaining elements are in the position shown in FIGURE 9, rotation of gear 114 will cause rotation of shaft 130. Shaft 130 will revolve at a smaller speed, however, for the reason that the lever arm between roller 128 and the center of rotation of link 124 is shorter than the lever arm from roller 118 to the center of rotation of link 124. When gear 114 has revolved 180°, the length of the lever arms will be reversed and, at this point, shaft 130 will rotate more rapidly than gear 114. It will also be apparent that there will be intermediate points at which gear 114 and shaft 130 will rotate at the same speed instantaneously. The speed ratio between the driving and driven members will be constantly changing. In each full revolution there will be a time when each is moving faster than the other and there will be two instants when they will move at the same speed. The overall relationship between the driving and driven members will, of course, be altered with each alteration in position of link 124. When link 124 is centered, gear 114 and shaft 130 will rotate at the same speed. When the link is in any other position, shaft 130 will run alternately faster and slower than gear 114. If support member 119 is lowered instead of raised, as previously described, the operation will be as described, but the high and low speed movements of shaft 130 will be 180° out of phase from the time support member 119 is raised.

By appropriate vertical adjustment of support member 119 and link 124, carriage 16 may be caused to move faster on the cutting stroke than on the return stroke or slower on the cutting stroke than on the return stroke. Adjustment of the vertical position of link 124 by motor 123 will also vary resistor 138. This will adjust the motor speed to maintain the same speed as the glass wool material at the time of cutting of the glass wool. If cutting takes place during the high speed portion of the cycle, it will be necessary to reduce the speed of main drive motor 1 to synchronize carriage 16 with the glass wool at the time of cutting. Consequently, the time for one cycle of the shear will be increased, and the length of cut will likewise be increased. Conversely, if the cutting stroke takes place during the slow part of the cycle, it will be necessary to increase the speed of drive motor 1 to have the speed of carriage 16 synchronized with the speed of the glass wool while cutting takes place. This will result in shortening the time for a total cycle and will produce sheets of shorter length.

When the speed of drive motor 1 is reduced to a low figure, its operating characteristics become unsuitable. The planetary transmission may be shifted to increase the gear ratio between main drive motor 1 and the speed change mechanism. The operating mechanism will close switch 136 and open switch 135 thereby increasing the speed of motor 1 to compensate for the change in gearing. There is no effect upon the speed at which gear 114 is driven. The sole result, therefore, is to narrow the speed range over which main drive motor 1 must drive the shear.

Use of the speed change mechanism, and of the motor speed control associated therewith, enables the length of cut to be varied over a wide range. To further extend the range of the length of cut, screen cams 66 and 73 are provided. Screen cam 65 operates at one-third the speed of main cam 49. If it is desired to increase the length of cut beyond that available from adjustment of the speed change mechanism, air cylinder 101 is energized to extend its piston. When knife 27 reaches its high point stroke, barrel cam 103 will cause pin 111 to be momentarily withdrawn into the shear housing. With this resistance to movement out of the way, the piston will extend and lever 94 will be pivoted to interlock seats 97 and 98. Rocker arm 37 will thus be held in one position and the shear will not cut during this time. When the low point of main cam 49 comes adjacent follower 50, the follower will simply remain in a fixed position while the low point passes it by. Movement of lever 94 will likewise free crank 91. Handle 88 is then pulled until depressions 89 and 90 in rod 87 are aligned with shift rods 83 and 89. Handle 81 is then pulled, moving screen cam 66 into alignment with roller follower 78 and aligning notch 86 in shift rod 79 with locking rod 87. The locking rod is then returned to its locking position and air cylinder 101 is energized to return lever 94 to its original position. When pin 111 is next withdrawn, lever 94 will return to position, unlocking arm 99 and locking rod 87 in fixed position.

Screen cam 66 rotates at one-third the speed of main cam 49. It is maintained in fixed position to main cam 49 and is timed so that high points 67 and 68 will be in contact with screen cam follower 78 when main cam follower 50 is opposite low point 52 of main cam 49. Low point 69 of screen cam 66 will be opposite screen cam follower 78 when main cam follower 50 is on the circular portion of main cam 49. The remaining part of screen cam 66 is inoperative and does not come in direct contact with screen cam follower 78. During the time high points 67 and 68 pass follower 78, main cam 49 will rotate approximately two times. The result is that on two consecutive revolutions of main cam 49 when the low point of main cam 49 comes adjacent follower 50, follower 78 will be in contact with high points 67 and 68. At these times, therefore, follower 78 will prevent movement of rocker shaft 34 and knife 27 will not make a cutting stroke. During the third revolution of main cam 49, screen cam 66 will not oppose the motion of rocker shaft 37, and knife 27 will make a cutting stroke. The interaction of main cam 49 and screen cam 66 causes knife 27 to make a cutting stroke only on every third reciprocation of carriage 16, with the result that pieces cut by the shear will be three times as long as if screen cam 66 had not been moved to active position. Low point 69 on screen cam 66 permits screen cam 66 to be moved between active and inactive position by unloading follower 78.

By reversing the process described above, screen cam 66 may be moved to inactive position and screen cam 73 may then be moved into working position in alignment with cam follower 78. Screen cam 73 rotates at one-sixth the speed of main cam 49. It is rotatably aligned with main cam 49 and high surfaces 75 will be adjacent screen cam follower 78 during the normal cutting stroke of knife 27. On the reverse stroke, high surfaces 76 will be adjacent to follower 78. Surfaces 76 are slightly undercut to unload follower 78 and allow screen cam 73 to be shifted between active and inactive position when carriage 16 is on its return or reverse stroke. A portion of screen cam 73 is completely cut away and permits rocker arm 37 to rotate on every sixth revolution of main cam 49 in the manner previously described. Consequently, when screen cam 73 is in operative position, the shear will cut pieces which are six times the length of the normal cut.

From the foregoing, it will be apparent that a flying shear is provided which will cut material of varying thickness moving at a wide range of speed and in any desired length over a wide range. The length of cut of the shear may be quickly and readily shifted and the shear may be instantaneously locked in non-cutting position when necessary. The shear may be operated at speeds ranging from ten to two hundred feet per minute. When the main cam is operative, it can be adjusted to cut sheets of any length between fifteen and forty-eight inches in length. By using the screen cam at the 3:1 ratio, sheets of any length between forty-five and one hundred and forty-four inches may be cut. By using the screen cam at the 6:1 ratio, sheets of any length between ninety and two hundred and eighty-eight inches may be cut. The use of the counter-balance spring and cam substantially reduces the size of the main drive motor. A twenty-five horsepower motor is adequate for the shear, but if the counterbalance spring and cam were not employed, a motor of two hundred horsepower would be required to compress spring 44.

While I have illustrated and described a present preferred embodiment of my invention, it is to be understood that I do not limit myself thereto and that the invention may be otherwise variously practiced within the scope of the following claims.

I claim:

1. A shear having a knife movable between a cutting position and an open position, movable knife operating means connected to said knife, means resiliently urging the operating means in one direction to move the knife to cutting position, main cam follower means on said operating means, main cam means placed for continuous contact with said follower, said cam means having a first position in which the knife is held in open position and a second position permitting controlled movement of the knife to cutting position, screen cam follower means on said operating means, selective screen cam means for contact with said screen cam follower means and so arranged to vary the frequency of oscillations of said screen cam follower, said screen cam means having a first position in which the knife is held in open position and the main cam follower means is intermittently held away from the main cam means and a second position permitting movement of the knife to closed position, whereby the knife is held in open position except when the main cam means and screen cam means are concurrently in said second positions, and cam drive means driving the main cam means and the screen cam means at different speeds whereby they will concurrently be in said second positions at predetermined intervals.

2. A shear having a knife movable between a cutting position and an open position, movable knife operating means connected to said knife, means resiliently urging the operating means in one direction to move the knife to cutting position, main cam follower means on said operating means, main cam means placed for continuous contact with said follower, said cam means having a first position in which the knife is held in open position and a second position permitting controlled movement of the knife to cutting position, screen cam follower means on said operating means, screen cam means shiftable for contact with said screen cam follower means, said screen cam means having a first position in which the knife is held in open position and the main cam means follower is intermittently held away from the main cam means and a second position permitting movement of the knife to closed position, whereby the knife is held in open position except when the main cam means and screen cam means are concurrently in said second positions, and cam drive means driving the main cam means and the screen cam means at different speeds whereby they will concurrently be in said second positions at predetermined intervals.

3. A shear having a knife movable between a cutting position and an open position, movable knife operating means connected to said knife, means resiliently urging the operating means in one direction to move the knife to cutting position, main cam follower means connected to the operating means, main cam means placed for continuous contact with the main cam follower between cutting and open positions, screen cam follower means connected to the operating means, screen cam means shiftably mounted for optional placement in active position for contact with the screen cam follower means, said cams having positions restraining the knife in open position and positions permitting the resilient means to move the knife to cutting position, whereby the knife is held in open position except when both cams concurrently permit movement of the knife to cutting position, and cam drive means driving the main cam means and the screen cam means at different speeds whereby when both cam means are in operative positions they are concurrently in position permitting the knife to move to cutting position at predetermined intervals.

4. A shear having a knife movable between a cutting position and an open position, movable knife operating means connected to the knife, means resiliently urging the operating means to move the knife to cutting position, main cam means, screen cam means, follower means connected to said operating means arranged for continuous contact with said cam means and cooperating with said cam means to limit movement of the operating means, each of said cam means having a first position in which the operating means is restrained from moving the knife to cutting position and a second position in which the operating means recedes for controlled movement of the knife to cutting position, whereby the knife is restrained in open position except when the main cam means and screen cam means are concurrently in said second positions, means for driving said cams at different speeds in a predetermined relationship whereby both cam means are concurrently positioned for controlled movement of the knife to cutting position and then to open position at predetermined intervals, and means for shifting said screen cam means to inoperative position.

5. A flying shear having a knife movable between a cutting position and an open position, means reciprocating the knife in forward and return strokes parallel the plane of passage of the material to be sheared, knife operating means connected to the knife, resilient means urging the operating means in one direction for movement of the knife to cutting position, main cam means, screen cam means, cam follower means connected to said operating means and in continuous contact with said cam means to limit movement of said operating means except by cam control, each of said cam means having a first position restraining the operating means to hold the knife in open position and a second position allowing controlled movement of the knife to cutting position, means driving said cam means at different speeds in predetermined relationship whereby said cam means are intermittently concurrently disposed in said second position during the forward stroke of the knife, and means to shift said screen cam means to inoperative position.

6. A shear having a knife movable between a cutting position and an open position, knife operating means connected to said knife, resilient means urging the knife to cutting position, main cam means, main cam follower means connected to the operating means and arranged for continuous contact with the main cam means, said main cam means having a first position restraining the knife in open position and a second position permitting the knife to be moved to cutting position by said resilient means, screen cam follower means connected to the operating means, screen cam means having a first position restraining the knife in open position and a second position permitting the knife to be urged to cutting position under continuous control of the main cam means, whereby the knife is moved to cutting position only when both said cam means are in said second positions, means to drive said cam means in a predetermined relationship but at different speeds whereby said cam means are in their second positions only intermittently, and means to shift the screen cam means to inoperative position, whereby movement of the knife is controlled only by the main cam means.

7. A shear having a knife movable between a cutting position and an open position, knife operating means connected to said knife, resilient means urging the knife to cutting position, main cam means, main cam follower means connected to the operating means and arranged for continuous contact with said cam means, said main cam means having a first position restraining the knife in open position and a second position permitting the knife to be moved to cutting position by said resilient means, screen cam follower means connected to the operating means, first screen cam means shiftable to operative position and then having a first position restraining the knife in open position and a second position permitting the knife to be urged to cutting position, second screen cam means shiftable to operative position and then having a first position restraining the knife in open position and a second position permitting the knife to be urged to cutting position and returned to open position by continuous contact of the main cam means and main cam follower means, means to drive all of said cam means in a predetermined relationship but at different speeds, and means to shift only one of said screen cams at a time to operative position, whereby movement of the knife is controlled alternatively by the main cam means, the main cam means and first screen cam means, and the main cam means and second screen cam means.

8. A shear having a knife movable between a cutting position and an open position, knife operating means connected to said knife, resilient means urging the knife to cutting position, main cam means, main cam follower means connected to the operating means and arranged for continuous contact with the main cam means, said main cam means having a first position restraining the knife in open position and a second position permitting the knife to be moved to cutting position by said resilient means under control of the main cam means, screen cam follower means connected to said knife operating means, screen cam follower means comprising a plurality of screen cams, means for moving said cams singly into operative position with said screen cam follower means, each of said cams having a knife restraining position and a knife cutting position, and means to drive all of said cams in a predetermined relationship but at different speeds, whereby when the main cam means and one of the screen cams are in operative position, the knife will move to cutting position under control of the main cam means only intermittently.

References Cited in the file of this patent
UNITED STATES PATENTS

| | | |
|---|---|---|
| 509,854 | Sawyer | Nov. 28, 1893 |
| 807,239 | Britton | Dec. 12, 1905 |
| 1,259,968 | Edwards | Mar. 19, 1918 |
| 2,168,400 | Evers | Aug. 8, 1939 |
| 2,261,007 | Talbot | Oct. 28, 1941 |
| 2,548,427 | Fernbach | Apr. 10, 1951 |
| 2,697,489 | Siegerist | Dec. 21, 1954 |
| 2,831,570 | Conrad | Apr. 22, 1958 |
| 2,832,410 | Soss | Apr. 29, 1958 |